Nov. 24, 1942.  A. S. JEWELL  2,302,869
TOOL HOLDER
Filed Aug. 30, 1941
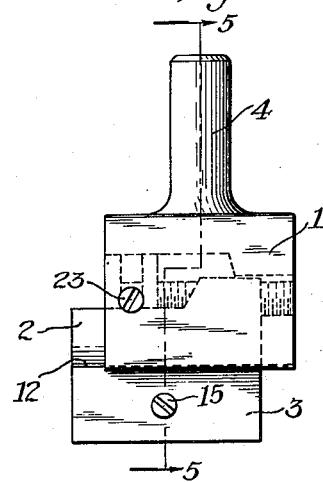
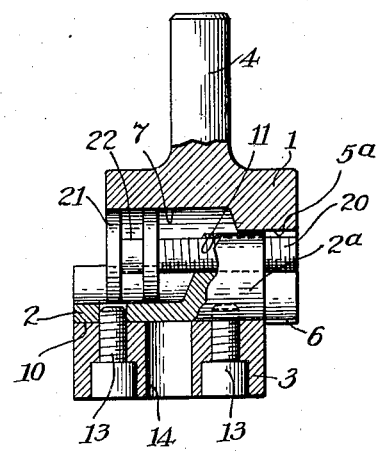
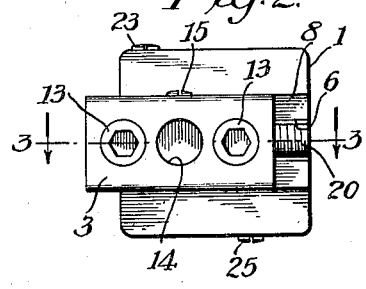
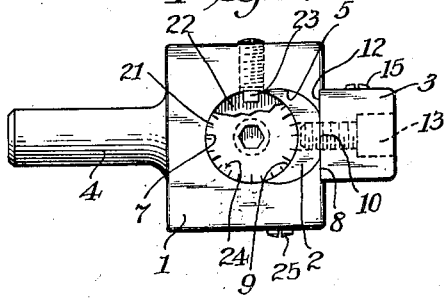
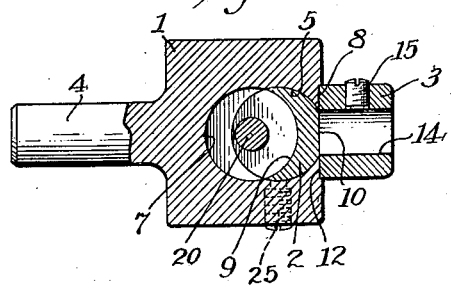
INVENTOR.
*Alwyn S. Jewell,*
BY R. W. Smith Patented Nov. 24, 1942

2,302,869

UNITED STATES PATENT OFFICE 2,302,869

TOOL HOLDER

Alwyn S. Jewell, Los Angeles, Calif.

Application August 30, 1941, Serial No. 409,032

3 Claims. (Cl. 279—6)

This invention is a tool holder of the type in which a cross head supports the tool and is adjustable transversely of the supporting axis of a body, for offset boring and the like.

It is an object of the invention to accurately adjust the cross head and rigidly support it in adjusted position, by a construction which is adapted for simple and inexpensive manufacture.

More particularly, it is an object of the invention to mount a cylindrical ram for longitudinal movement in a corresponding transverse bore in the body of a holder, with an abutment surface along the length of the ram and flush with a transverse bearing surface of the body, and with a cross head which supports the tool rigidly fixed to the abutment surface of the ram and snugly slidably engaging the transverse bearing surface of the body.

Manufacture of the tool holder is thus reduced to simple machining operations which are inexpensively and accurately performed; comprising transversely cylindrically boring the holder with the periphery of the bore opening through the front surface of the holder; milling the front surface of the holder to form a bearing surface parallel to the axis of the bore; turning a cylindrical ram to slidably fit the bore; milling the periphery of the ram to form an abutment surface flush with the bearing surface of the body; and securely attaching a cross head to the abutment surface of the ram so that a bearing surface of the cross head is parallel to the axis of the ram and snugly engages the cooperating bearing surface of the body.

Further objects of the invention will be readily understood from the following description of the accompanying drawing, in which:

Fig. 1 is a plan view of the tool holder.

Fig. 2 is a front elevation.

Fig. 3 is a section on the line 3—3 of Fig. 2.

Fig. 4 is a side view of the tool holder.

Fig. 5 is a section on the line 5—5 of Fig. 1.

The tool holder comprises a body 1, a ram 2 and a cross head 3, with the cross head fixed to the ram and this unit adjustable for micrometer adjustment transversely of the longitudinal axis of the body.

The body 1 has a longitudinal shank 4 adapted for reception in a chuck, tail stock or the like. The body is cylindrically bored transversely of the axis of the shank 4, as shown at 5, with the periphery of this bore opening through the front surface of the body as shown at 6. The body is also cylindrically bored transversely of the axis of the shank 4, as shown at 7, with the bore 7 in rear of and eccentric to and partially overlapping the bore 5 as shown at Fig. 5. The bore 5 extends the full width of the body 1, while the bore 7 terminates short of one end of the body so that the continuation of the bore 5, beyond the bore 7, forms an annular bearing as shown at 5a. The front surface of the body 1 is grooved to form a plane bearing surface 8, transverse to the axis of the shank 4 and parallel to the axes of the bores 5—7.

The ram 2 is a cylinder adapted for snug sliding reception in the bore 5. This cylinder has an abutment surface 10 at its periphery, extending the length of the ram, and adapted for reception in the opening 6 so that it is flush with the front bearing surface 8 of the body. The ram is axially bored as shown at 9, with this bore eccentric to the axis of the ram and corresponding in diameter to the bore 7, so that the periphery of the bore 9 opens through the rear of the cylindrical ram. The bore 9 terminates short of one end of the ram, so that this end of the cylinder 2 is a circumferentially uninterrupted journal 2a, adapted for reciprocation in the annular bearing 5a. The journal 2a is tapped concentric with the bore 9 as shown at 11.

The cross head 3 is fixed to the abutment surface 10 of the ram 2 and projecting above and below the same so as to form plane bearing surfaces 12, received in the groove in the front surface of the body 1 and slidably engaging the bearing surface 8 of the body. The cross head is fixed to the ram by screws 13, and medially of its length is bored perpendicular to the bearing surfaces 8-12, as shown at 14, for reception of the shank of a tool such as a boring tool. The shank of the tool is fixed in the bore 14 by a set screw 15.

A micrometer screw 20 is threaded at one end into the tapped bore 11, and at its opposite end has an annular head 21, annularly grooved at 22, and journaled in the bearing which is defined by the cooperating bores 7-9. A screw 23 in the body 1, extends into the annular groove 22 so as to fix the micrometer screw against axial displacement.

Rotating the micrometer screw, by engaging its head 21 at the open end of the cooperating bores 7-9, thus transversely adjusts the ram 2 and the cross head 3 relative to the body 1, so that the tool holding bore 14 of the cross head is concentric or offset with relation to the shank 4, as indicated by the index 24 at the outer end of the head 21. A set screw 25 in the body 1, engages the ram 2 for fixing the cross head in adjusted position.

The tool holder as thus described is readily manufactured and its cross head is readily adjustable so that its bore 14 is concentric or offset relative to the shank 4, with the cross head then rigidly held in accurately adjusted position. The simple boring, turning and plane-surfacing operations which are required, are readily performed with substantially no tolerance between interfitting parts, so that the cross head may be accurately adjusted and then rigidly held, without play, and with its bore 14 exactly perpendicular to the cooperating bearing surfaces 8—12, which are in turn exactly perpendicular to the axis of the shank 4.

I claim:

1. In a tool holder, a body having a transverse plane bearing surface, with a transverse bore in the body opening at its periphery through said bearing surface, and with a second transverse bore in the body eccentric to and partially overlapping the rear portion of one end of the first transverse bore and terminating short of an opposite bearing end of said first transverse bore; a cylindrical ram slidable in the first transverse bore and eccentrically bored at one end to correspond to the second transverse bore and forming a journal at its opposite end for reception in the bearing end of said first transverse bore, the ram having a peripheral abutment surface at the opening in and flush with the bearing surface of the body; a cross head fixed to the abutment surface of the ram and having a plane bearing surface slidably engaging the plane bearing surface of the body, the cross head having a bore for reception of the shank of a tool, with said bore perpendicular to the cooperating plane bearing surfaces of the body and cross head; a micrometer screw concentric with the second transverse bore of the body, said screw being tapped at one end into the journal end of the ram and having an annularly grooved head at its opposite end journaled in the bearing which is defined by the bore of the ram and the second transverse bore of the body; and means projecting from the body into the annular groove in the head of the screw for fixing said screw against axial displacement.

2. In a tool holder; a body having a transverse plane bearing surface, with a transverse bore in the body opening at its periphery through said bearing surface, and with a second transverse bore in the body eccentric to and partially overlapping the rear portion of one end of the first transverse bore and terminating short of an opposite bearing end of said first transverse bore; a cylindrical ram slidable in the first transverse bore and eccentrically bored at one end to correspond to the second transverse bore and forming a journal at its opposite end for reception in the bearing end of said first transverse bore, the ram having a peripheral abutment surface at the opening in and flush with the bearing surface of the body; a cross head fixed to the abutment surface of the ram and having a plane bearing surface slidably engaging the plane bearing surface of the body, the cross head having a bore for reception of the shank of a tool, with said bore perpendicular to the cooperating plane bearing surfaces of the body and cross head; and means journaled in the bearing which is defined by the bore of the ram and the second transverse bore of the body, and connected to the body and to the ram for slidably adjusting the ram along the first transverse bore of the body.

3. In a tool holder; a body having a transverse plane bearing surface, with a transverse bore in the body comprising a segment of a cylinder with the chord of the segmental bore in the plane of said bearing surface; a ram comprising a segment of a cylinder slidable in said transverse bore with the chord of the segmental ram forming an abutment surface in the plane of said bearing surface; a cross head fixed to the abutment surface of the ram and having a plane bearing surface slidably engaging the plane bearing surface of the body, the cross head having a bore for reception of the shank of a tool, with said bore perpendicular to the cooperating plane bearing surfaces of the body and cross head; and means journaled in the body and connected to the body and to the ram for slidably adjusting the ram along the transverse bore of the body.

ALWYN S. JEWELL.